US012737647B2

(12) United States Patent
Jang et al.

(10) Patent No.: US 12,737,647 B2
(45) Date of Patent: Sep. 15, 2026

(54) APPARATUS AND METHOD FOR SHARING AUGMENTED INTELLIGENCE MODEL OF CONTAINERIZED ARTIFICIAL INTELLIGENCE MODULE

(71) Applicant: ELECTRONICS AND TELECOMMUNICATIONS RESEARCH INSTITUTE, Daejeon (KR)

(72) Inventors: Choul-Soo Jang, Daejeon (KR); Byoung-Youl Song, Daejeon (KR); Young-Sook Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 559 days.

(21) Appl. No.: 18/468,188

(22) Filed: Sep. 15, 2023

(65) Prior Publication Data

US 2024/0152779 A1 May 9, 2024

(30) Foreign Application Priority Data

Nov. 3, 2022 (KR) ........................ 10-2022-0145544

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 11,238,125 B1 * 2/2022 Brody ................. G06F 16/9535
11,657,402 B2 * 5/2023 Harris .................... G06Q 10/10 705/304
11,763,236 B1 * 9/2023 Sharma ............. G06Q 10/0635 707/737

(Continued)

FOREIGN PATENT DOCUMENTS

JP 2021068442 A 4/2021
KR 10-2021-0121914 A 10/2021

(Continued)

OTHER PUBLICATIONS

Im Sujeong, "[Introduction to AI Service Development] Docker," https://velog.io/@sujeongim/series/AI, Jun. 29, 2024.

*Primary Examiner* — David E Choi
(74) *Attorney, Agent, or Firm* — Rabin & Berdo, P.C.

(57) ABSTRACT

Disclosed herein are an apparatus and method for sharing an augmented intelligence model of a containerized artificial intelligence (AI) model. The apparatus includes memory in which at least one program is recorded and a processor for executing the program. The program may perform downloading an AI module of a Docker image included in a robot application from container storage by referring to previously stored application configuration information, retrieving model information about an intelligence model used by the AI module from model information storage and downloading the corresponding intelligence model from model storage based on the retrieved model information, and executing the AI module in a container by mounting the intelligence model stored in a local file system as a volume in the container.

20 Claims, 13 Drawing Sheets

(56) References Cited

U.S. PATENT DOCUMENTS 11,875,240 B1* 1/2024 Bosnjakovic ........... G06F 40/40
12,093,872 B2* 9/2024 Mahindru ........ G06Q 10/06393
12,204,565 B1* 1/2025 Yu ....................... G06F 16/2471
12,210,858 B1* 1/2025 Silver ....................... G06F 8/60
12,229,810 B2* 2/2025 Fam ......................... G06N 3/02
12,314,017 B2* 5/2025 Ripa ....................... G06F 9/543
12,332,841 B1* 6/2025 Hoagland ............... G06F 16/16
12,332,896 B1* 6/2025 Xu .................... G06F 16/24549
12,498,906 B2* 12/2025 Groenewegen ........... G06F 8/33
12,530,728 B2* 1/2026 Muthu ................... G06N 20/00
12,561,327 B1* 2/2026 Kuruganthy ...... G06F 16/24545
2015/0006432 A1* 1/2015 Grosset ................ G06Q 10/067 705/348
2017/0286398 A1* 10/2017 Hunt ....................... G06F 40/30
2018/0121810 A1* 5/2018 Guo ....................... G06N 3/004
2018/0293103 A1* 10/2018 Kalmus ................. G06F 9/5005
2018/0357571 A1* 12/2018 Sun ........................ G06N 3/006
2021/0049328 A1* 2/2021 Choi ..................... G06F 16/332
2021/0064666 A1* 3/2021 Wang ................ G06F 16/90332
2021/0103834 A1* 4/2021 Avadhanula ........... G06N 20/00
2021/0117859 A1 4/2021 Rogers et al.
2021/0133560 A1* 5/2021 Jung ........................ G06N 3/09
2021/0263733 A1* 8/2021 Tanniru ............... G06F 11/3452
2021/0334461 A1* 10/2021 Chae ..................... G06F 40/268
2022/0094760 A1* 3/2022 Jang .......................... G06F 8/63
2022/0105630 A1 4/2022 Kim et al.
2022/0164701 A1 5/2022 Shrivastava
2022/0269589 A1* 8/2022 Aggarwal ........... G06F 11/3684
2023/0168994 A1* 6/2023 Hans ................... G06F 16/9024 717/124
2023/0267323 A1* 8/2023 Agarwal ............ G06Q 10/0637 706/18
2023/0385037 A1* 11/2023 Jayaraman ................ G06F 8/75
2024/0169163 A1* 5/2024 Nguyen .................. G06F 40/30
2024/0202284 A1* 6/2024 Aggarwal .............. G06N 5/022
2024/0265420 A1* 8/2024 Glazier .............. G06Q 30/0214
2024/0273123 A1* 8/2024 Costa ...................... G06F 40/30
2024/0275743 A1* 8/2024 Le .......................... G06N 3/096
2024/0354498 A1* 10/2024 Prasad .................... G06F 40/20
2024/0386204 A1* 11/2024 Sangarapillai ........ G06F 40/284
2024/0403566 A1* 12/2024 Sengupta ................ G06F 40/35
2024/0419658 A1* 12/2024 Trache .................. H04L 67/306
2024/0427981 A1* 12/2024 Wadhwa ................ G06N 20/00
2024/0430277 A1* 12/2024 Marbouti ............ H04L 63/1416
2025/0036545 A1* 1/2025 Lahr .................... G06N 3/0475
2025/0077848 A1* 3/2025 Zhao ...................... G16H 50/20
2025/0086217 A1* 3/2025 Marks ................. G06F 16/3344
2025/0117592 A1* 4/2025 Ein-Dor .................. G06F 40/40
2025/0131147 A1* 4/2025 Bielke ..................... G06F 30/17
2025/0150345 A1* 5/2025 Sun ..................... H04L 41/0886
2025/0173541 A1* 5/2025 Dolph .................... G06N 3/006
2025/0184573 A1* 6/2025 Stockman .......... H04N 21/2187
2025/0190473 A1* 6/2025 Wood .................... G06F 16/345
2025/0190861 A1* 6/2025 Sun ........................ G06N 20/00
2025/0190884 A1* 6/2025 Silver ....................... G06F 8/60
2025/0200358 A1* 6/2025 Lee ....................... G06F 16/332
2025/0209041 A1* 6/2025 Palamara ............ G06F 3/04845
2025/0217673 A1* 7/2025 Silver ....................... G06F 8/30
2025/0251914 A1* 8/2025 Ahlawat ................... G06F 8/33
2025/0285012 A1* 9/2025 Blair ...................... G06N 20/00
2025/0298988 A1* 9/2025 Buchanan ............... G06F 40/35
2025/0315683 A1* 10/2025 Feehan .................... G06N 5/04
2025/0335159 A1* 10/2025 Yunoki ..................... G06F 8/33
2025/0348911 A1* 11/2025 Zhou .................. G06Q 30/0277
2025/0355649 A1* 11/2025 Buzzalino ............... G06F 8/427
2025/0355947 A1* 11/2025 Wiggins ............ G06F 16/90335
2026/0017126 A1* 1/2026 Kazemi Rad ....... G06F 11/0769
2026/0023718 A1* 1/2026 Deutsch ................ G06F 16/164
2026/0023786 A1* 1/2026 Choubey ........... G06F 16/90332
2026/0029993 A1* 1/2026 Rudravajjala ............. G06F 8/33
2026/0080165 A1* 3/2026 Sharpe .................. G06F 40/211
2026/0087164 A1* 3/2026 Ketharaju ........... G06F 21/6227
2026/0087245 A1* 3/2026 Wang .................... G06F 40/186
2026/0087374 A1* 3/2026 Martini ............. G06F 16/90332

FOREIGN PATENT DOCUMENTS

KR 10-2364505 B1 2/2022
KR 10-2022-0040065 A 3/2022
KR 10-2394293 B1 5/2022

* cited by examiner

APPARATUS AND METHOD FOR SHARING AUGMENTED INTELLIGENCE MODEL OF CONTAINERIZED ARTIFICIAL INTELLIGENCE MODULE

CROSS REFERENCE TO RELATED APPLICATION

This application claims the benefit of Korean Patent Application No. 10-2022-0145544, filed Nov. 3, 2022, which is hereby incorporated by reference in its entirety into this application.

BACKGROUND OF THE INVENTION

1. Technical Field

The present disclosure relates to technology capable of providing a service by modularizing various types of Artificial Intelligence (AI) in a robot and by combining modules with each other.

2. Description of the Related Art

In order to enable a robot to provide services, robot application software is created by combining various types of AI software.

For example, robots provide services to users by combining various types of AI software for voice recognition, natural-language processing, object recognition, user recognition, behavior recognition, appearance feature recognition, location recognition, travel path generation, joint trajectory generation, manipulation information generation, and the like using voice information, image information, and various types of sensor information.

Robot application software developers like developing and distributing software using a modular method by standardizing input/output and execution characteristics of AI software using software frameworks, such as Robot Operating System (ROS), Robot Technology Component (RTC), Open Platform for Robotic Services (OPRoS), and the like in order to easily combine various types of AI software.

Meanwhile, performance of the newest AI modules has been greatly improved through development of machine learning based on an artificial neural network, and more and more neural-network-based AI modules are being released.

A neural-network-based AI module configured with neural network data and an algorithm for AI requires various external packages required for the AI algorithm as well as various AI frameworks, such as TensorFlow, Caffe, PyTorch, Keras, and the like in order to construct a neural network. That is, in order to run neural-network-based AI modules dependent on various AI frameworks and external packages, the corresponding framework and various packages on which the algorithm is dependent have to be installed in an Operating System (OS).

However, because versions of AI frameworks and external packages required by various AI modules may differ from each other or because a conflict may occur between libraries required by the external packages, dependencies conflict with each other, which makes it difficult to simultaneously run multiple AI modules on a single OS.

In order to solve this problem, container technology, which is configured to create and execute a virtualization image including all of an OS, a runtime, a system library, and an external package required for execution of software using a Docker, has been recently developed.

However, in order to replace existing model data stored in an AI module created as a Docker image with newly augmented model data, it is necessary to newly build a Docker image, but it is cumbersome. Further, because the built Docker image has a large size, it takes a long time to distribute the built Docker image, so it is difficult to immediately improve the intelligence of a robot despite the augmented robot intelligence model.

SUMMARY OF THE INVENTION

An object of the disclosed embodiment is to provide a method for easily sharing, when intelligence for a containerized AI module based on a robot software framework is augmented, the augmented intelligence without newly building a Docker image.

An apparatus for sharing an augmented intelligence model of a containerized AI module according to an embodiment includes memory in which at least one program is recorded and a processor for executing the program. The program may perform downloading an AI module of a Docker image included in a robot application from container storage by referring to previously stored application configuration information; retrieving model information about an intelligence model used by the AI module from model information storage and downloading the corresponding intelligence model from model storage based on the retrieved model information; and executing the AI module in a container by mounting the intelligence model stored in a local file system as a volume in the container.

Here, the program may further perform configuring the robot application based on module basic information stored in module basic information storage and storing the application configuration information about the configured robot application in application configuration information storage, and when configuring the robot application, the program may configure the robot application based on a selection that is input by a user through a robot application configuration graphic user interface (GUI), including a module list window and a robot application configuration window, and may perform listing pieces of AI module basic information stored in the module basic information storage in the module list window, disposing AI modules selected from among the listed pieces of AI module basic information at selected locations in the robot application configuration window, and setting a communication connection relationship between the disposed AI modules.

Here, the model information may include the source file of a class required for reconstructing a neural network structure of the intelligence model and a model URL file containing the path of a model file of each version.

Here, when downloading the intelligence model, the program may perform acquiring the model information corresponding to an intelligence model name by connecting to the URL of the model information storage, changing the model information to a snapshot of a desired version by performing a checkout with a model version included in the model information, and downloading an intelligence model file from a network-based storage device or a cloud storage service using a model storage access path URL indicated by the snapshot.

Here, the module basic information may include reference information for each of the Docker image and the intelligence model required for executing the AI module, and when configuring the robot application, the program may further perform extending the module basic information of the AI module disposed in the robot application configuration window.

Here, the reference information for the Docker image may include at least one of a Docker image name, an operation platform, or the URL of Docker storage, or a combination thereof as basic information, and when extending the module basic information, the program may add at least one of environment variables required for executing the container, a command that can be optionally input when executing the container, or input parameters for the command, or a combination thereof to the reference information for the Docker image.

Here, the program may download the Docker image, corresponding to a Docker image name and an operation platform, using the URL of Docker storage, set environment variables required for executing the container, set a command capable of being optionally input and input parameters for the command when necessary, and execute the Docker image by creating a container instance.

Here, the reference information for the intelligence model may include at least one of an intelligence model name, an operation platform, the URL of the model information storage, or the path of a directory to be stored as the volume of the container, or a combination thereof as basic information, and when extending the module basic information, the program may add at least one of the version of the used intelligence model, or an automatic update policy of the model in use, or a combination thereof to the reference information for the intelligence model.

Here, when the automatic update policy is set to NoUpdate, the program may download the intelligence model depending on whether a downloaded and cached intelligence model is present. When the automatic update policy is set to UpdateOnStart, the program may check whether the model is the latest version only when starting a Docker, and may newly download and execute the latest version when the latest version is newer than a downloaded and cached intelligence model. When the automatic update policy is set to UpdateOnRunning, if the latest model is present, the program may always download the latest model even when a Docker container is running, and may sequentially execute the Docker container again through a rolling update.

A method for sharing an augmented intelligence model of a containerized AI module according to an embodiment may include downloading an AI module of a Docker image included in a robot application from container storage by referring to previously stored application configuration information; retrieving model information about an intelligence model used by the AI module from model information storage and downloading the corresponding intelligence model from model storage based on the retrieved model information; and executing the AI module in a container by mounting the intelligence model stored in a local file system as a volume in the container.

Here, the method may further include configuring the robot application based on module basic information stored in module basic information storage and storing the application configuration information about the configured robot application in application configuration information storage. Configuring the robot application may comprise configuring the robot application based on a selection that is input by a user through a robot application configuration GUI, including a module list window and a robot application configuration window, and configuring the robot application may include listing pieces of AI module basic information stored in the module basic information storage in the module list window, disposing AI modules selected from among the listed pieces of AI module basic information at selected locations in the robot application configuration window, and setting a communication connection relationship between the disposed AI modules.

Here, the model information may include the source file of a class required for reconstructing a neural network structure of the intelligence model and a model URL file containing the path of a model file of each version.

Here, downloading the intelligence model may include acquiring the model information corresponding to an intelligence model name by connecting to the URL of the model information storage, changing the model information to a snapshot of a desired version by performing a checkout with a model version included in the model information, and downloading an intelligence model file from a network-based storage device or a cloud storage service using a model storage access path URL indicated by the snapshot.

Here, the module basic information may include reference information for each of the Docker image and the intelligence model required for executing the AI module, and configuring the robot application may further include extending the module basic information of the AI module disposed in the robot application configuration window.

Here, the reference information for the Docker image may include at least one of a Docker image name, an operation platform, or the URL of Docker storage, or a combination thereof as basic information, and extending the module basic information may comprise adding at least one of environment variables required for executing the container, a command that can be optionally input when executing the container, or input parameters for the command, or a combination thereof to the reference information for the Docker image.

Here, the Docker image, corresponding to the Docker image name and the operation platform, may be downloaded using the URL of the Docker storage, the environment variables required for executing the container may be set, the command capable of being optionally input and the input parameters for the command may be set when necessary, and the Docker image may be executed by creating a container instance.

Here, the reference information for the intelligence model may include at least one of an intelligence model name, an operation platform, the URL of the model information storage, or the path of a directory to be stored as the volume of the container, or a combination thereof as basic information, and extending the module basic information may comprise adding at least one of the version of the used intelligence model, or an automatic update policy of the model in use, or a combination thereof to the reference information for the intelligence model.

Here, when the automatic update policy is set to NoUpdate, the intelligence model may be downloaded depending on whether a downloaded and cached intelligence model is present. When the automatic update policy is set to UpdateOnStart, whether the model is the latest version may be checked only when starting a Docker, and when the latest version newer than a downloaded and cached intelligence model is present, the latest version may be newly downloaded and executed. When the automatic update policy is set to UpdateOnRunning, if the latest model is present, the latest model may be always downloaded even when a Docker container is running, after which Docker container may be sequentially executed again through a rolling update.

An apparatus for sharing an augmented intelligence model of a containerized AI module according to an embodiment includes memory in which at least one program is recorded and a processor for executing the program. The program may perform configuring a robot application by setting a communication connection relationship between AI modules selected from among pieces of AI module basic information stored in module basic information storage; storing application configuration information about the configured robot application in application configuration information storage; downloading an AI module of a Docker image included in the robot application from container storage by referring to the stored application configuration information; retrieving model information about an intelligence model used by the AI module from model information storage and downloading the corresponding intelligence model from model storage based on the retrieved model information; and executing the AI module in a container by mounting the intelligence model stored in a local file system as a volume of the container.

Here, the model information may include the source file of a class required for reconstructing a neural network structure of the intelligence model and a model URL file containing the path of a model file of each version, and downloading the intelligence model may include acquiring the model information corresponding to an intelligence model name by connecting to the URL of the model information storage, changing the model information to a snapshot of a desired version by performing a checkout with a model version included in the model information, and downloading an intelligence model file from a network-based storage device or a cloud storage service using a model storage access path URL indicated by the snapshot.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
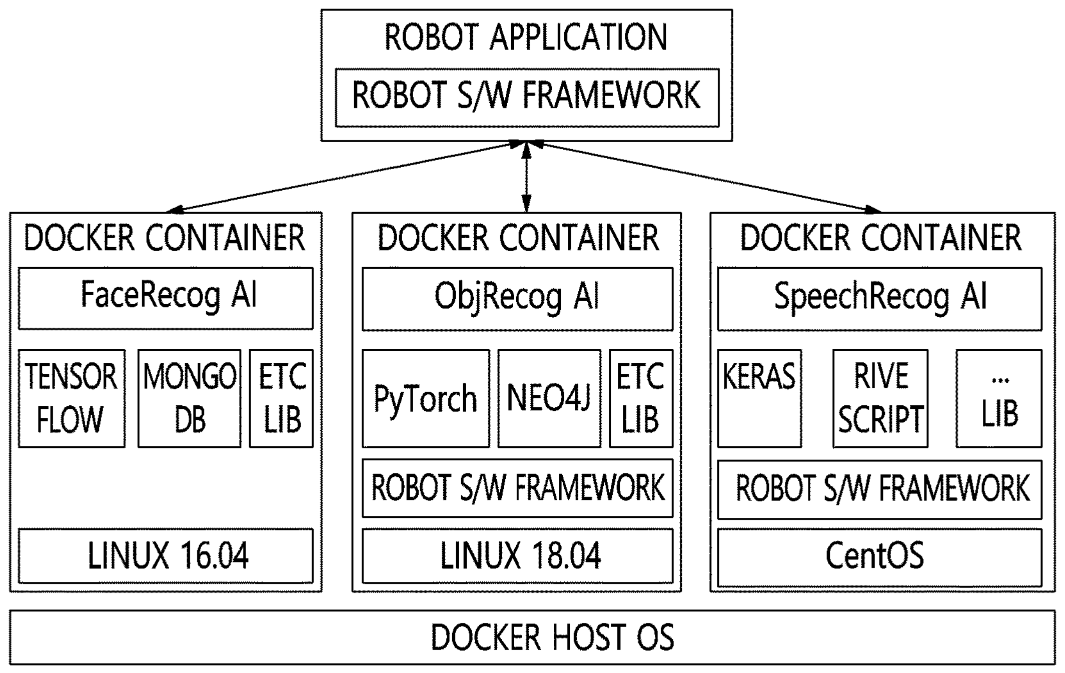
FIG. 1 is a view for explaining a containerized AI module for a robot.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for sharing an augmented intelligence model of a containerized AI module according to an embodiment will be described in detail with reference to FIGS. 1 to 15.

FIG. 1 is a view for explaining a containerized AI module for a robot.

Referring to FIG. 1, various AI modules installed in a robot and a robot software framework are containerized into a single package and distributed to a robot, and these are combined using the communication function of the robot software framework, whereby an application for enabling the robot to provide a service to a user is completed.

Figure 2:
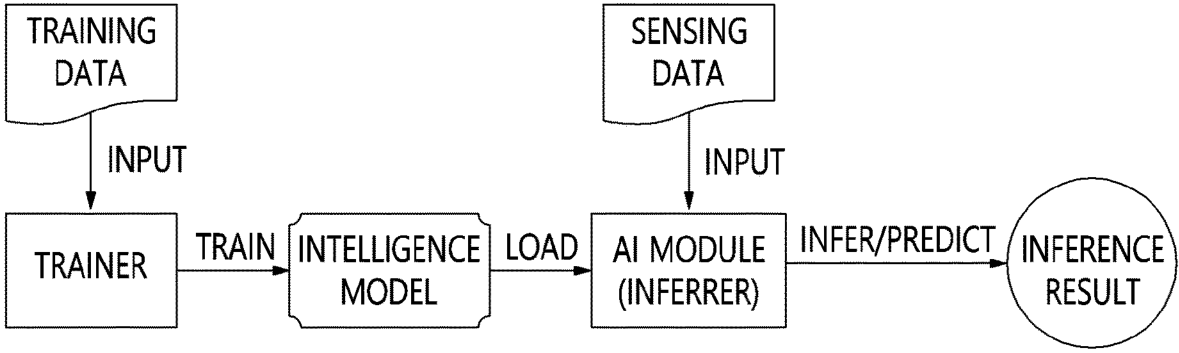
FIG. 2 is a view for explaining an AI module.

FIG. 2 is a view for explaining an AI module.

Referring to FIG. 2, a trainer trains an intelligence model by receiving training data as input, and the intelligence model that has been trained is loaded into an AI module for a robot, which serves as an inferrer, and is used to perform the unique function of the AI module, such as inference or prediction, by receiving sensing data from the robot.

Here, because the process of training an AI model requires large amounts of computation resources and time, it is performed not in the robot but in a high-performance server in a cloud environment or the like by using greater amounts of data, a high-performance GPU, and more computing resources.

When an augmented intelligence model having more improved accuracy than an existing intelligence model is generated using the high-performance server in the cloud environment, an existing AI module running in the robot using the existing intelligence model is updated with the augmented intelligence model, whereby the intelligence-related performance of the robot may be gradually improved.

Figure 3:
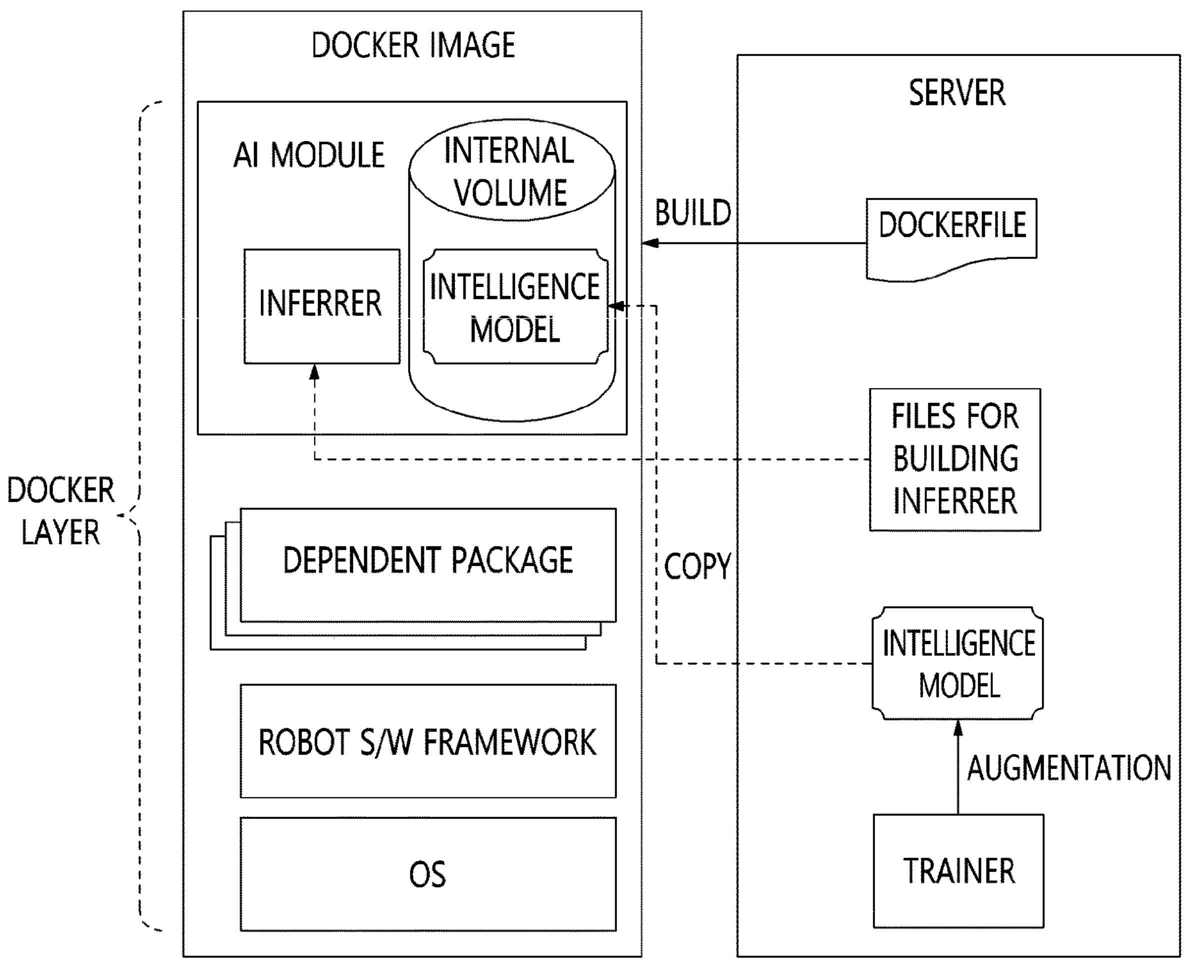
FIG. 3 is an exemplary view of replacement of an intelligence model in a Docker image.

FIG. 3 is an exemplary view of replacement of an intelligence model in a Docker image.

Referring to FIG. 3, in order to replace existing model data stored in an AI module created as a Docker image with newly augmented model data, it is necessary to complete a Docker image through the process of newly building a Docker image in a cloud server in which a trainer is operating and the process of copying the augmented model data to a volume in the Docker.

In order to newly build a Docker image, it is necessary for the cloud server, which performs training for augmentation, to prepare all of the trainer, executable code or source code corresponding to an inferrer, and data about a package on which AI modules are dependent, so management has many challenges.

Also, when the built Docker image is distributed to each robot for running the AI module, it takes a lot of time to transmit and restart the Docker image because the size of the Docker image is increased by including the intelligence model.

That is, in the conventional method, it is cumbersome to newly build a Docker image whenever a model is augmented, and it is time-consuming to distribute the built Docker image due to a large size thereof. Therefore, it is difficult to immediately improve the intelligence of a robot even though a robot intelligence model is augmented.

In an embodiment, an intelligence model is separated from a Docker image and managed as each version for robot AI software modularized as the Docker image using a robot software framework, and when an AI module is started by being instantiated as a container or is run, an appropriate version of the intelligence model or the newest augmented intelligence model may be connected to a volume of the container such that the AI module is run.

Figure 4:
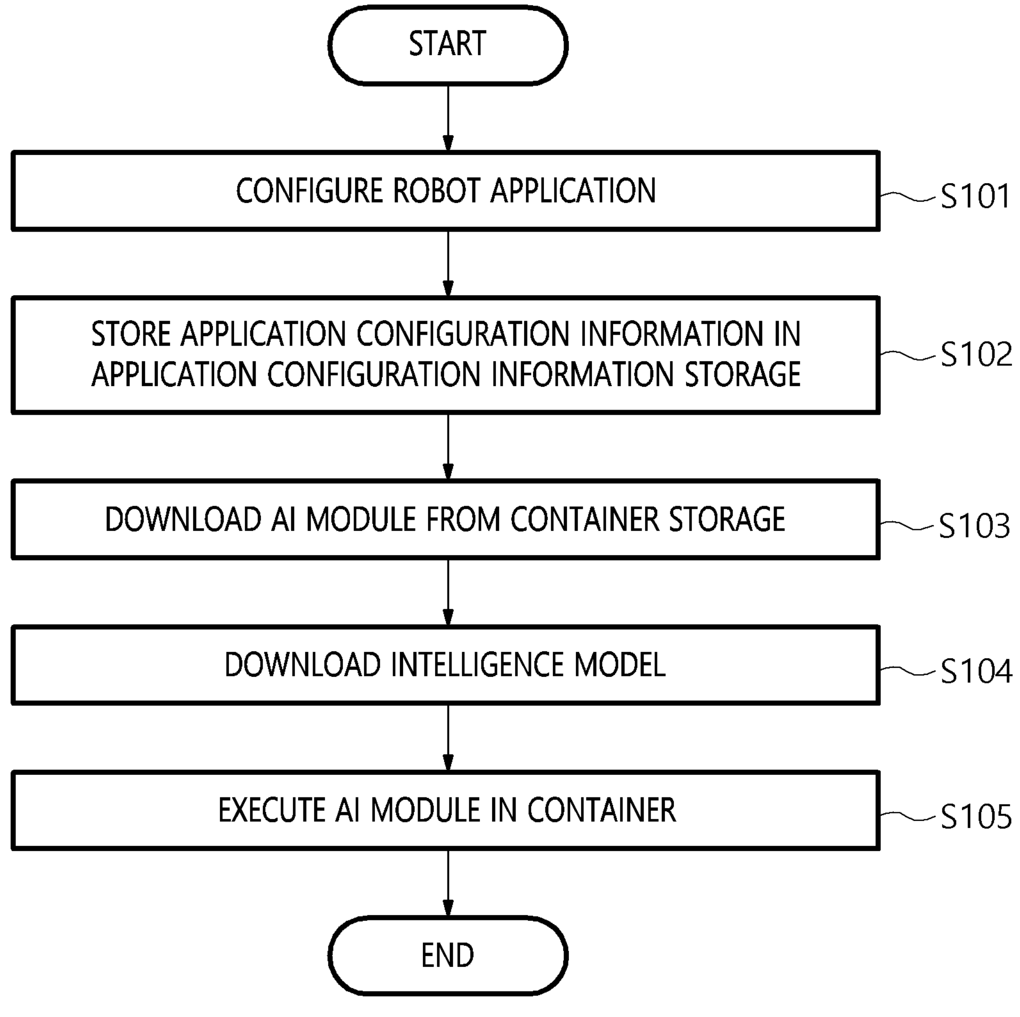
FIG. 4 is a flowchart for explaining a method for sharing an augmented intelligence model of a containerized AI module according to an embodiment.
Figure 5:
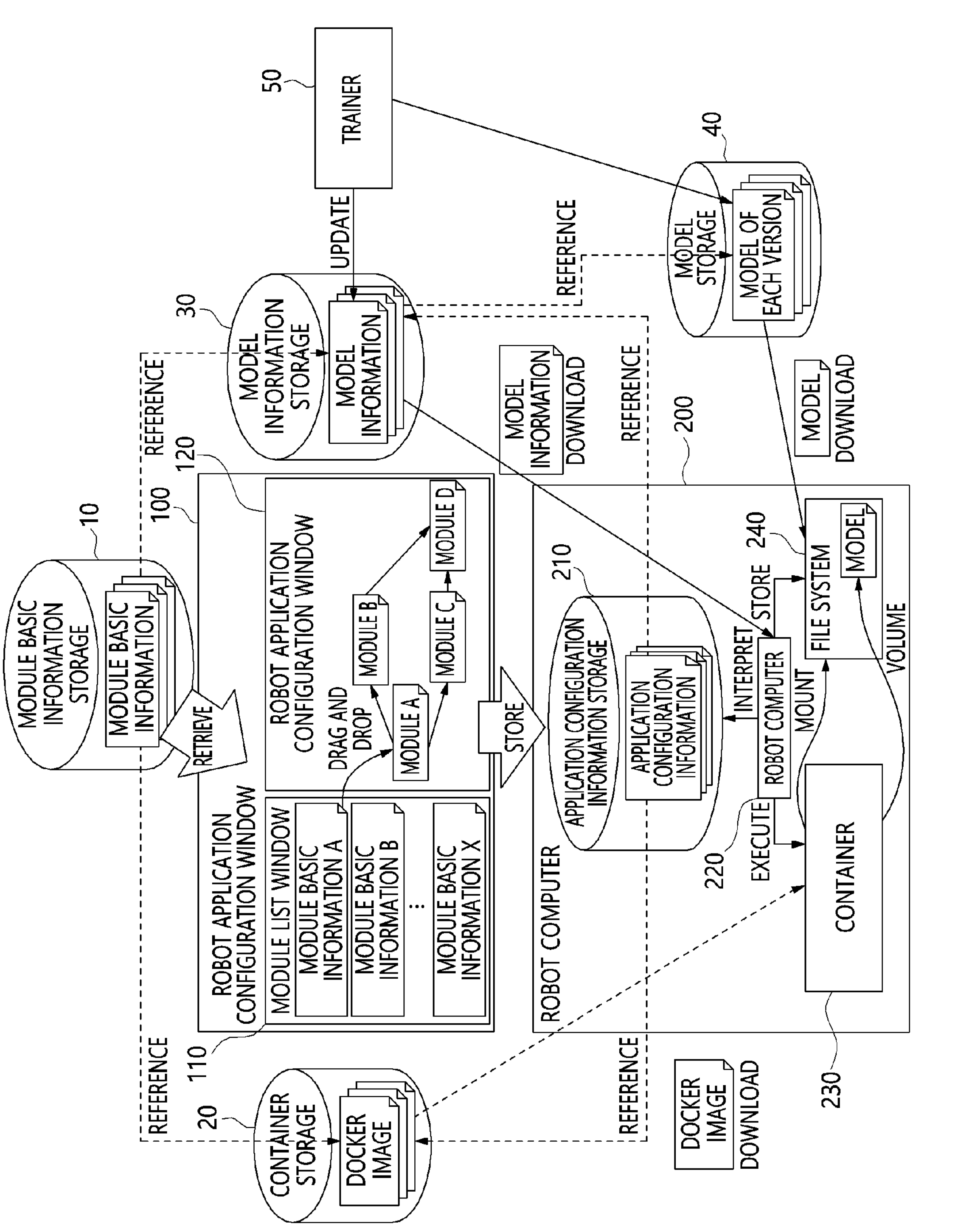
FIG. 5 is a system configuration diagram for explaining a method for sharing an augmented intelligence model for a containerized AI module according to an embodiment.

FIG. 4 is a flowchart for explaining a method for sharing an augmented intelligence model of a containerized AI module according to an embodiment, and FIG. 5 is a system configuration diagram for explaining a method for sharing an augmented intelligence model of a containerized AI module according to an embodiment.

Referring to FIG. 4, the method for sharing an augmented intelligence model of a containerized AI module according to an embodiment may include downloading an AI module of a Docker image included in a robot application from container storage by referring to previously stored application configuration information at step S103, retrieving model information about an intelligence model used by the AI module from model information storage and downloading the corresponding intelligence model from model storage based on the retrieved model information at step S104, and executing the AI module in a container by mounting the intelligence model stored in a local file system as a volume of the container at step S105.

Here, the method for sharing an augmented intelligence model of a containerized AI module according to an embodiment may further include configuring the robot application based on module basic information stored in module basic information storage at step S101 and storing the application configuration information about the configured robot application in application configuration information storage at step S102.

Here, when the robot application is configured at step S101, the robot application may be configured based on a selection that is input by a user through a robot application configuration Graphic User Interface (GUI).

That is, referring to FIG. 5, a list of pieces of module basic information stored in the module basic information storage 10 is displayed in the module list window 110 of the robot application configuration GUI 100.

Here, the module basic information is generated along with the AI module when the AI module is generated, and includes reference information about each of a Docker image and an intelligence model required for executing the AI module. The module basic information will be described in detail later with reference to FIGS. 10 to 12.

Subsequently, AI modules selected from among the pieces of AI module basic information listed in the module list window 110 are disposed at selected locations in a robot application configuration window 120. That is, a user may place the module basic information in the robot application configuration window through mouse drag-and-drop.

Finally, when the communication connection relationship between the disposed AI modules is set, the robot application is generated.

Here, when the robot application is configured at step S101, extending the module basic information of the AI module in the application configuration window may be further performed. That is, reference information for each of the Docker image and the intelligence model, which are the module basic information, may be added. This will be described in detail later with reference to FIGS. 10 to 12.

The application configuration information about the robot application generated as described above is stored in the application configuration information storage 210 in a robot computer 200.

Subsequently, a distribution agent 220 installed in the robot computer interprets the application configuration information corresponding to the robot application selected to be executed in response to a user request or according to the determination of the robot itself.

Accordingly, depending on the result of interpreting the application configuration information, the distribution agent 220 downloads the AI module of the Docker image included in the module basic information included in the robot application from container storage 20 to a container 230 at step S103.

Also, at step S104, the distribution agent 220 retrieves model information about the intelligence model used by each of the AI modules from the model information storage 30, interprets the model information, downloads the required intelligence model from the model storage 40, and stores the intelligence model in the local file system 240.

Here, the intelligence model may be augmented through training. Accordingly, each of the model information storage 30 and the model storage 40 may be updated with the augmented intelligence model. This will be described in detail later with reference to FIG. 6 and FIG. 7.

Also, downloading the augmented intelligence model to the robot computer 200 will be described in detail later with reference to FIG. 8 and FIG. 9.

Subsequently, when the AI module is executed in the container 230, the model stored in the local file system 240 is mounted as a volume of the container. Accordingly, the AI module accesses the volume, which is mounted in the execution initialization process, as if it were a local file system, and then loads the intelligence model into memory, thereby completing neural network data and using the same for the process of performing the algorithm of the module.

Figure 6:
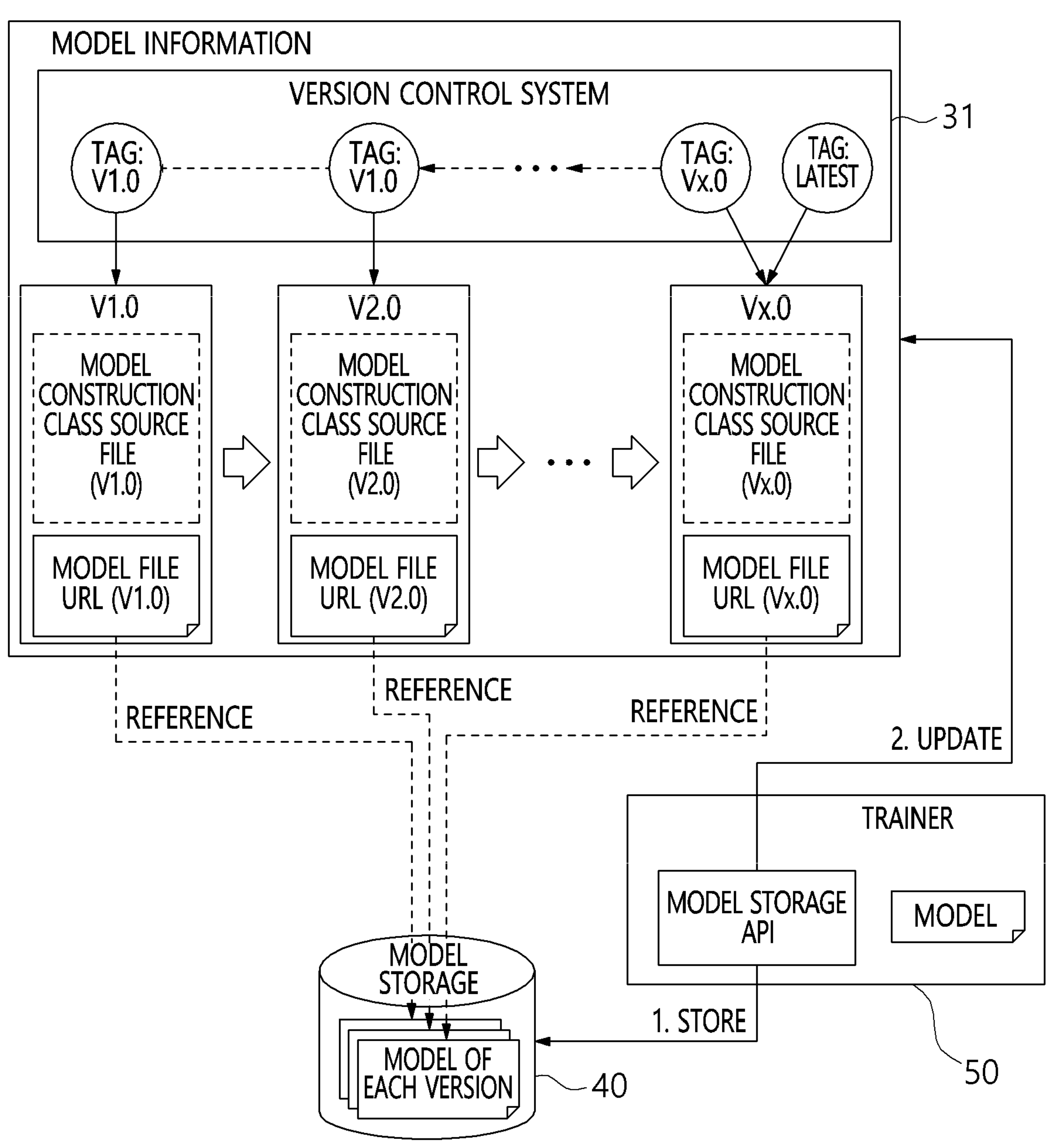
FIG. 6 is an exemplary view for explaining a process of storing an augmented intelligence model for a Dockerized AI module according to an embodiment.
Figure 7:
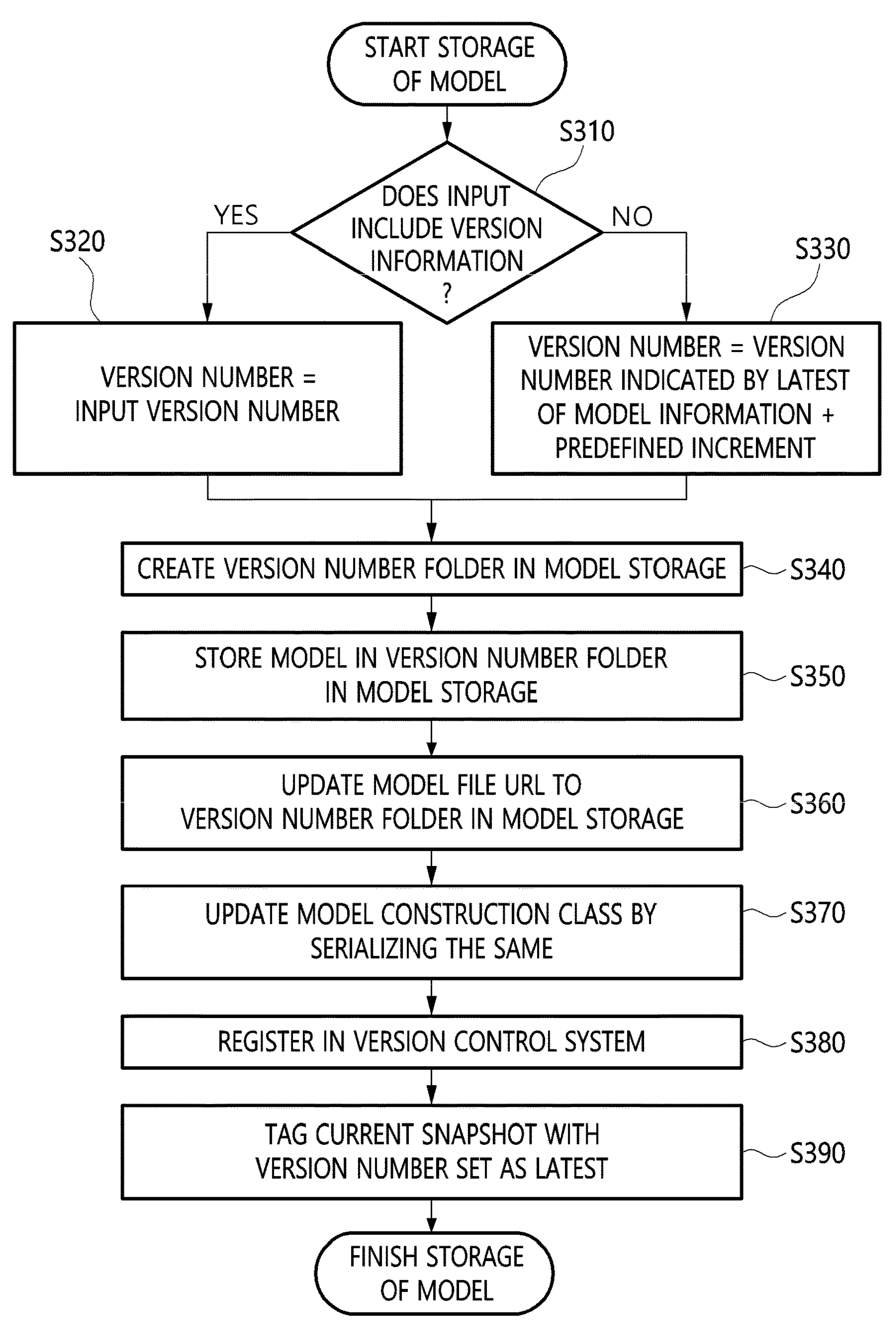
FIG. 7 is a flowchart for explaining a process of storing an augmented intelligence model for a Dockerized AI module according to an embodiment.

FIG. 6 is an exemplary view for explaining a process of storing an augmented intelligence model for a Dockerized AI module according to an embodiment, and FIG. 7 is a flowchart for explaining a process of storing an augmented intelligence model for a Dockerized AI module according to an embodiment.

Referring to FIG. 6, model information stored in the model information storage 30 may be configured with the source file of a class required for reconstructing a neural network structure of an intelligence model and a model URL file that contains the path of a model file of each version.

Here, the source file of the model construction class may be selectively generated depending on the method of storing and loading the model construction class in an AI framework at a lower layer. For example, in the case of PyTorch, the source file of a model construction class is required to instantiate a class extending Torch.nn.Module, but in the case of TensorFlow and Keras, a model file itself includes a model construction class, so the source file of the model construction class may not be required.

Also, in the model information, the versions of the source file of the model construction class and the versions of the model file may be managed using a Version Control System (VCS) 31, such as Git, Subversion (SVN), or the like.

However, when a model in the form of a large binary is directly stored and managed in such a common version control system (VCS), such as Git or Subversion (SVN), a problem such as a limitation in the storage capacity, or a performance problem may be caused.

Accordingly, only key information, such as model version information of the model information, is managed by the version control system (VCS) 31, and the model file itself may be stored by constructing model storage 40 using a network-based storage device, such as Network Attached Storage (NAS), or a cloud storage service, such as a Google bucket or an Amazon S3 bucket. Accordingly, only path URL information for accessing the stored model and a model construction class in the form of source file having a small size are stored in the model information.

When an intelligence model is augmented using a trainer 50 in the cloud or server outside a robot, the trainer 50 may add the augmented intelligence model in the model storage 40 using a model storage API 51 and update the model information using information about the added model version.

Here, in order to call the model storage API 51, a URL for the model information and a URL of the storage in which the model is to be stored may be used as the input parameters thereof.

Referring to FIG. 7, the called model storage API 51 determines whether input parameters include a version number set by a user at step S310.

When it is determined at step S310 that the input parameters include the version number set by the user, the model storage API 51 sets a version number to the version number input by the user at step S320.

Conversely, when it is determined at step S310 that the input parameters do not include a version number set by the user, the model storage API 51 identifies the latest version of the currently used model, sets a version number by automatically adding an increment to the latest version number, and uses the version number in order to update the model version information at step S330.

Subsequently, the model storage API 51 generates a folder corresponding to the model version in the model storage 40 at step S340, generates a model corresponding to a neural network weight using a method provided by the AI framework at a lower layer, stores the model in the form of a file in the corresponding folder, updates the model file URL information, and registers the same in the version control system (VCS) at steps S350 to S360.

Also, the model storage API 51 generates a file by serializing the model construction class using a method of storing and loading a model construction class in the AI framework at the lower layer, stores the file as the model information, and registers the same in the version control system (VCS) at steps S370 to S380.

Subsequently, when storage and registration of the model are completed, the model storage API 51 tags a snapshot of the current model information with the model version name and 'latest' using the version control system (VCS) at step S390.

Figure 8:
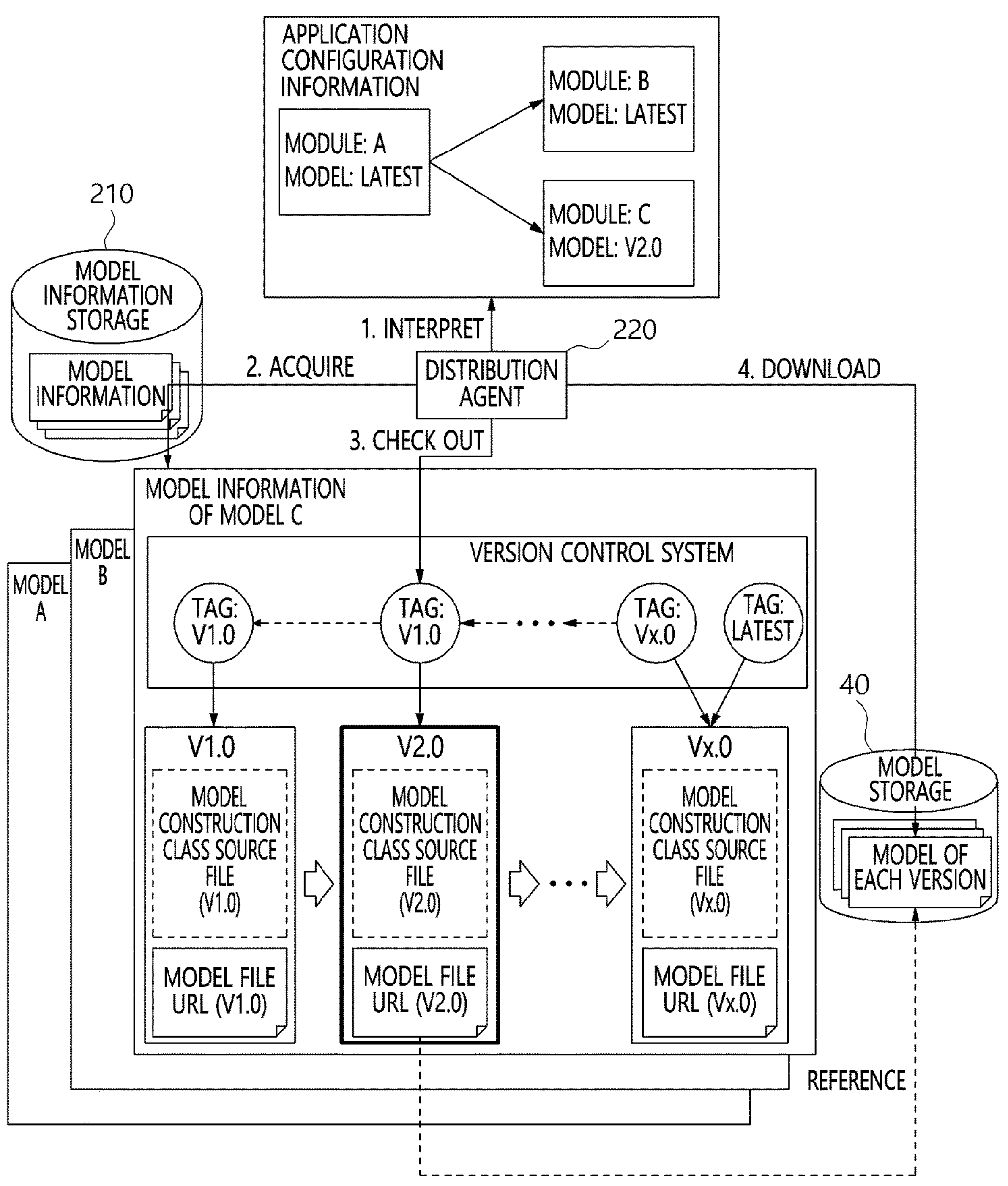
FIG. 8 is an exemplary view of download of an intelligence model for a Dockerized AI module according to an embodiment.
Figure 9:
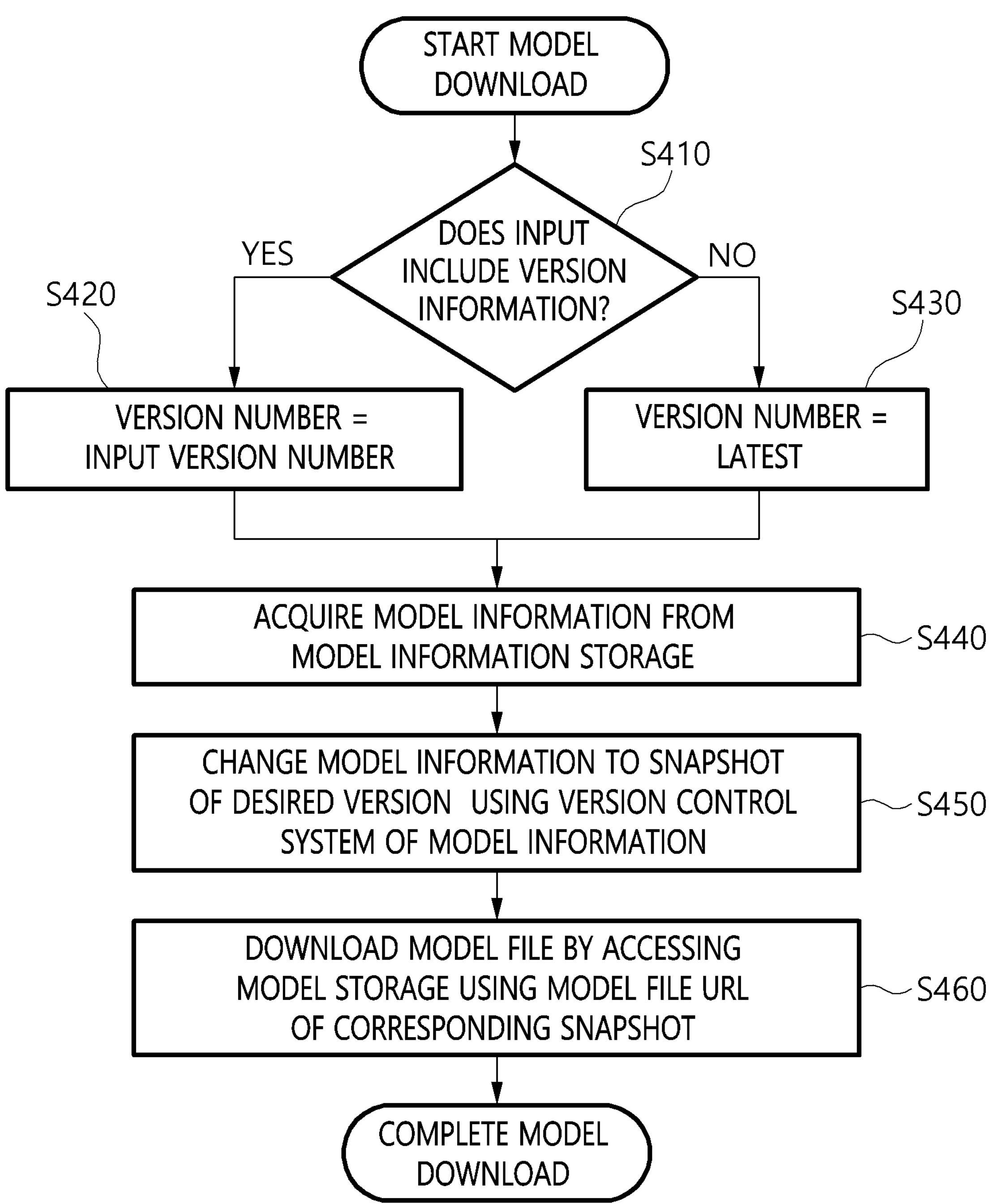
FIG. 9 is a flowchart for explaining a process of downloading an intelligence model for a Dockerized AI module according to an embodiment.

FIG. 8 is an exemplary view of download of an intelligence model for a Dockerized AI module according to an embodiment, and FIG. 9 is a flowchart for explaining a process of downloading an intelligence model for a Dockerized AI module according to an embodiment.

Referring to FIG. 8 and FIG. 9, a distribution agent 220 running in a robot computer 200 sets an intelligence model corresponding to an input version number or the latest version number as a download target at step S420 or S430 depending on whether input includes version information at step S410.

Subsequently, the distribution agent 220 connects to a URL of model information storage and takes a copy of model information corresponding to an intelligence model name at step S440. Then, it performs a checkout with the model version included in the model information and managed by a version control system (VCS), thereby changing the model information to a snapshot of the desired version at step S450.

Subsequently, the distribution agent 220 downloads a model file from a network-based storage device or a cloud-based storage service using a model storage access path URL indicated by the model information of the corresponding snapshot at step S460.

Here, the model files downloaded to the robot computer are stored in internal cache storage and used. That is, when an AI module restarts and intends to download the used intelligence model in order to use the same, if a model file already stored in the internal cache is present, the model file in the cache storage is used without downloading the model file again.

Figure 10:
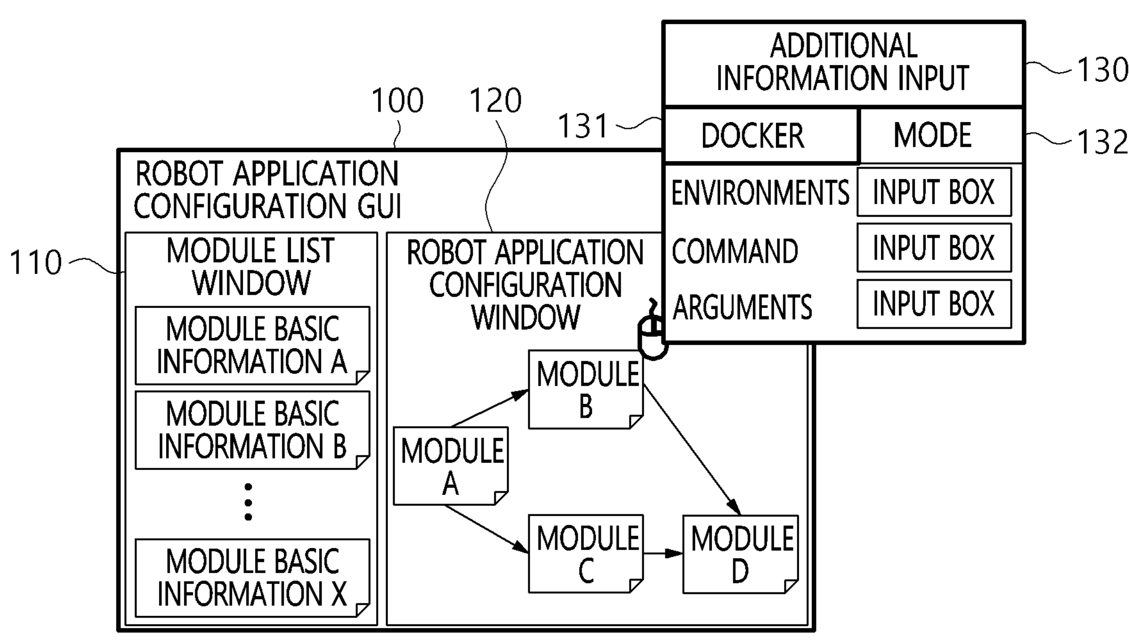
FIG. 10 is an exemplary view of a window for inputting additional information related to a Docker for a Dockerized AI module according to an embodiment.

FIG. 10 is an exemplary view of a window for inputting additional information related to a Docker for a Dockerized AI module according to an embodiment.

Referring to FIG. 10, when a robot application is configured at step S101, the robot application may be configured based on a selection that is input by a user through a robot application configuration Graphic User Interface (GUI), as described above.

Here, when the robot application is configured at step S101, the module basic information of an AI module in an application configuration window may be extended.

That is, for each of a Docker image and an intelligence model, which are the module basic information, information that is extended from the module basic information so as to match the characteristics of a robot or an environment may be added to the application configuration information.

That is, full information for referring to a Docker image from the module basic information and full information about an AI model are completed by inputting additional information by selecting a Docker tab 131 and a model tab 132 of an additional information input window 130 that appears in response to a right-click of a mouse after the modules are dragged and dropped to the robot application configuration window through the robot application configuration GUI 100.

Here, reference information for a Docker image is as shown in Table 1 below.

TABLE 1

| item | Description | basic information |
|---|---|---|
| Name | Docker image name | O |
| Platform | operation platform (e.g., X86, ARM, Raspberry, etc.) | O |
| Registry | URL of Docker storage | O |
| Environments | environment variables that are necessary when container is executed | |
| Command | command that can be optionally input when container is executed | |
| Arguments | input parameters for optional command | |

Referring to Table 1, information not included in the application configuration information but included only in the module basic information includes 'Name', 'Platform', and 'Registry'. Conversely, items not included in the module basic information but additionally input only to the application configuration information are 'Environments', 'Command', and 'Arguments'.

Accordingly, the distribution agent run in the robot computer downloads a Docker image, corresponding to the Docker image name and the operation platform, using a docker storage URL of the reference information for the Docker image, which is included in the application configuration information, sets the environment variables required for executing a container, sets an optionally input command and input parameters when necessary, and executes the Docker image by creating a container instance.

Reference information for an intelligence model is as shown in Table 2 below.

TABLE 2

| item | Description | basic information |
|---|---|---|
| Name | AI model name | O |
| Platform | operation platform (e.g., CPU, GPU, etc.) | O |
| Registry | URL of model information storage | O |
| Volume | path of directory to be stored as volume in container | O |
| Version | used AI model version (e.g., version such as v1.0, v2.0, etc., or latest) | |
| AutoUpdatePolicy | Automatic update policy of model in use (e.g., NoUpdate, UpdateOnStart, UpdateOnRunning) | |

Referring to Table 2, information not included in the application configuration information but included only in the module basic information includes 'Name', 'Platform', 'Registry', and 'Volume'. Conversely, items not included in the module basic information but additionally input only to the application configuration information are 'Version' and 'AutoUpdatePolicy'.

Figure 11:
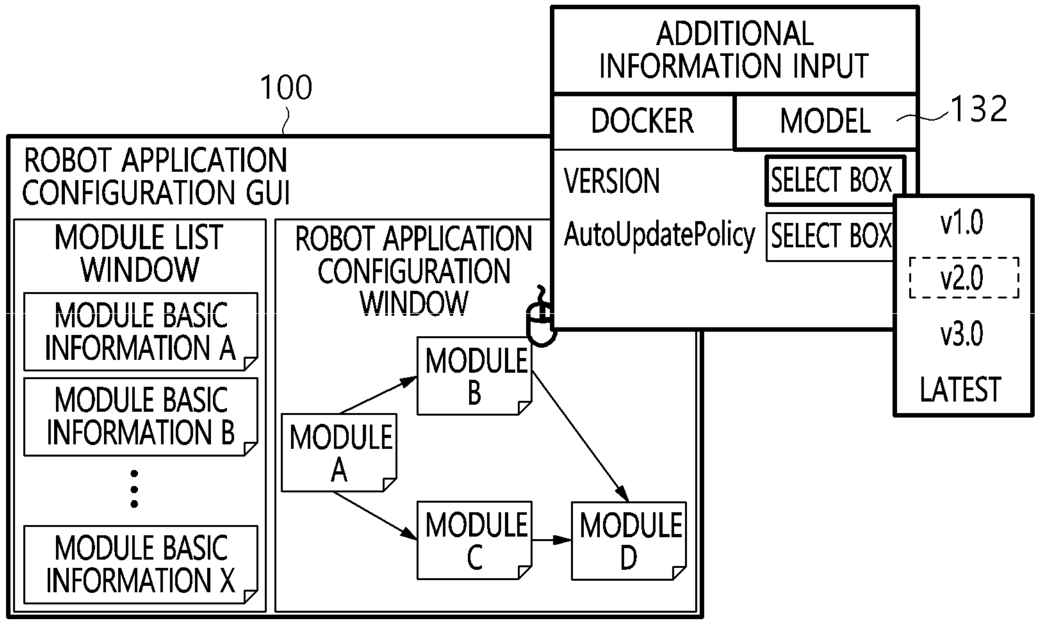
FIG. 11 is an exemplary view of a selection of a model in a window for inputting additional information related to a model for a Dockerized AI module according to an embodiment.

FIG. 11 is an exemplary view of a selection of a model in a window for inputting additional information related to a model for a Dockerized AI module according to an embodiment.

Referring to FIG. 11, full information about an AI model is completed from the module basic information by inputting additional information through a model tab of an additional information input window that appears in response to a right-click of a mouse after the modules are dragged and dropped to the robot application configuration window through the robot application configuration GUI 100. Here, in the case of a version, a list of version names, which are attached as tags in a version control system (VCS) at a model storage step, is acquired by accessing model information stored in the model information storage 30 and displayed in a select box such that a version name can be selected.

The downloaded model file is set to be mounted as the volume defined in the reference information of the model when the Docker image is executed by creating a container instance, thereby being loaded and used by an AI module.

Here, AutoUpdatePolicy in the application configuration information for an AI model defines a policy shown in Table 3 below in order to perform update with an updated model when an intelligence model is updated by being augmented.

TABLE 3

| policy | Description |
|---|---|
| NoUpdate | When model downloaded to and cached in local storage of robot computer is present, it is used, whereas when model cached in local storage is not present, download is performed |
| UpdateOnStart | Whether model is the latest version is checked only when Docker starts, and when the latest version is present, it is downloaded and executed |
| UpdateOnRunning | When model is updated to the latest version while Docker is running, model is newly downloaded and Docker is executed again |

Figure 12:
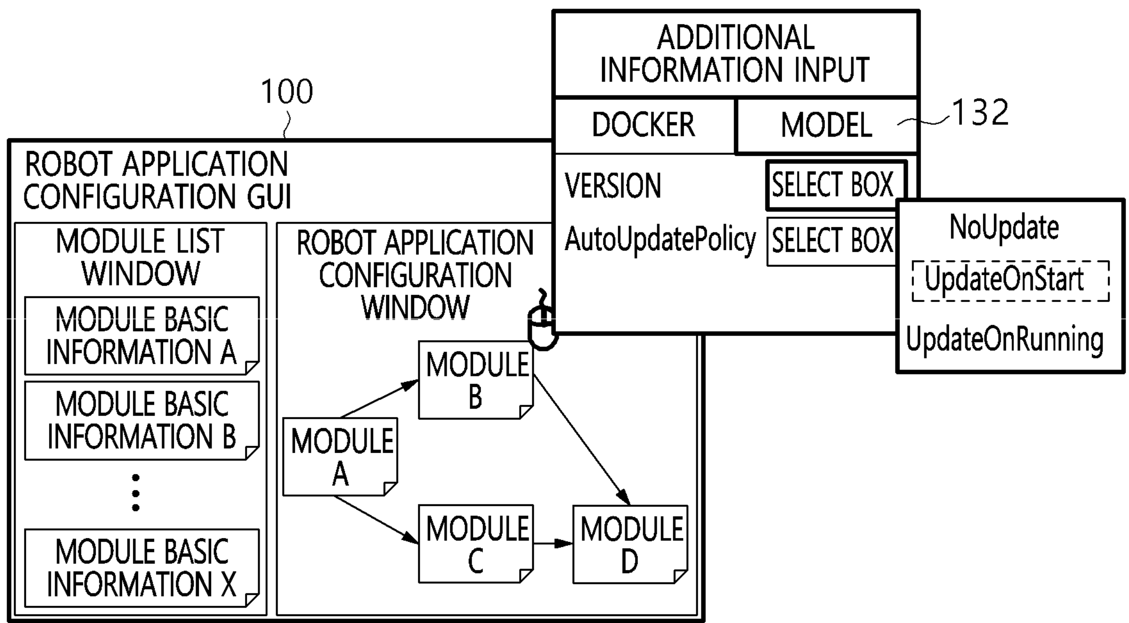
FIG. 12 is an example of a selection of an update policy in a window for inputting additional information related to a model for a Dockerized AI module according to an embodiment.

FIG. 12 is an example of a selection of an update policy in a window for inputting additional information related to a model for a Dockerized AI module according to an embodiment.

Referring to FIG. 12, an update policy is input through an AutoUpdatePolicy select box by selecting a model tab 132 of an additional information input window that appears in response to a right-click of a mouse after the modules are dragged and dropped to the robot application configuration window through the robot application configuration GUI 100.

Here, when AutoUpdatePolicy is set to NoUpdate, if a model that is cached in a robot computer by being downloaded is present, the model is used, and download is performed only when a model cached in the robot computer is not present.

Also, when AutoUpdatePolicy is set to UpdateOnStart, whether a model is the latest version is checked only when a Docker starts, and when a version that is newer than the model that is downloaded to and cached in the robot computer is present, the version is downloaded and executed.

Also, when AutoUpdatePolicy is set to UpdateOnRunning, if the latest model is present, the latest model is always downloaded even when a Docker container is running, and the Docker container is executed again through a rolling update.

Figure 13:
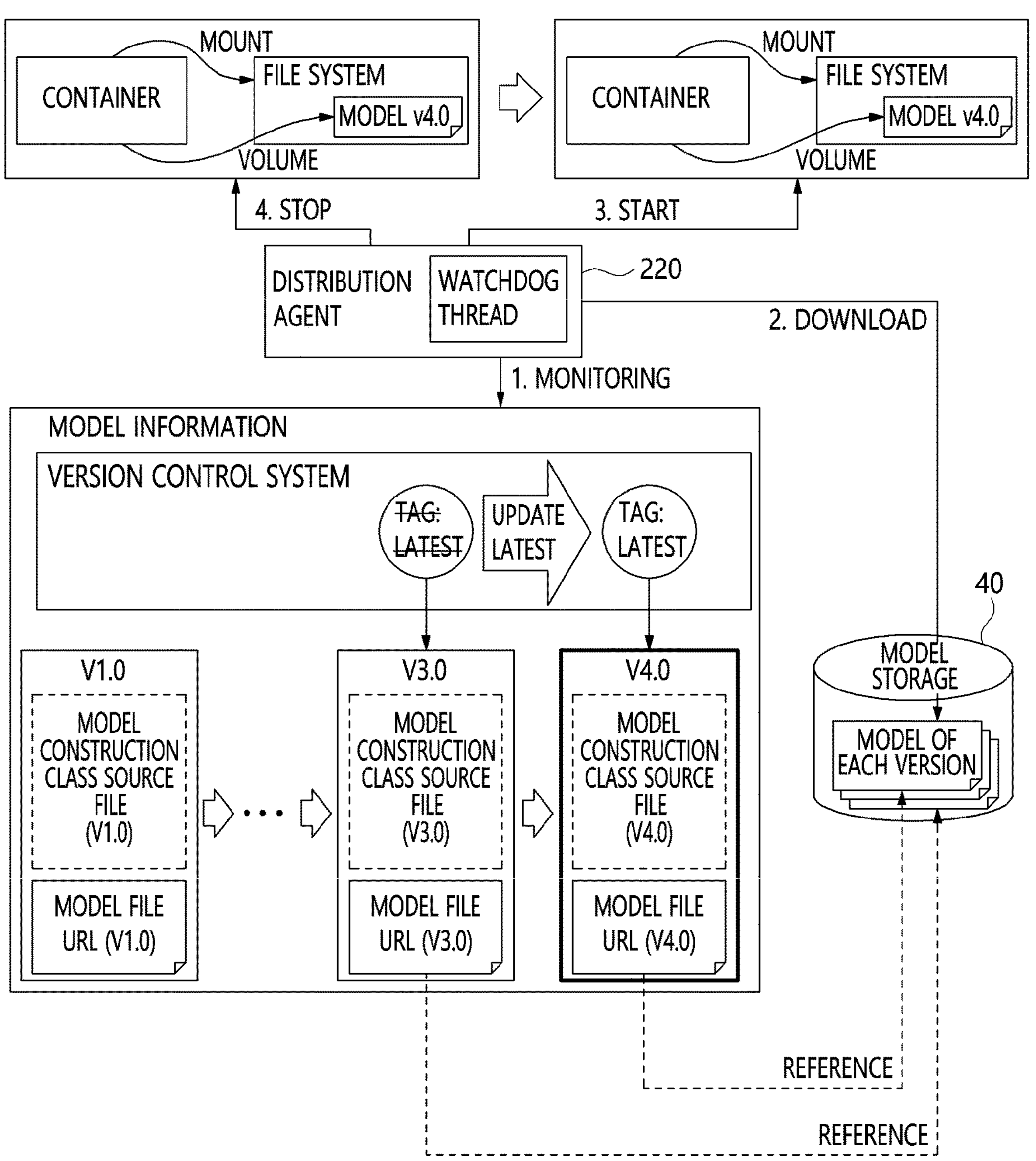
FIG. 13 and FIG. 14 are exemplary views of rolling update of an augmented intelligence model for a Dockerized AI module according to an embodiment.
Figure 14:
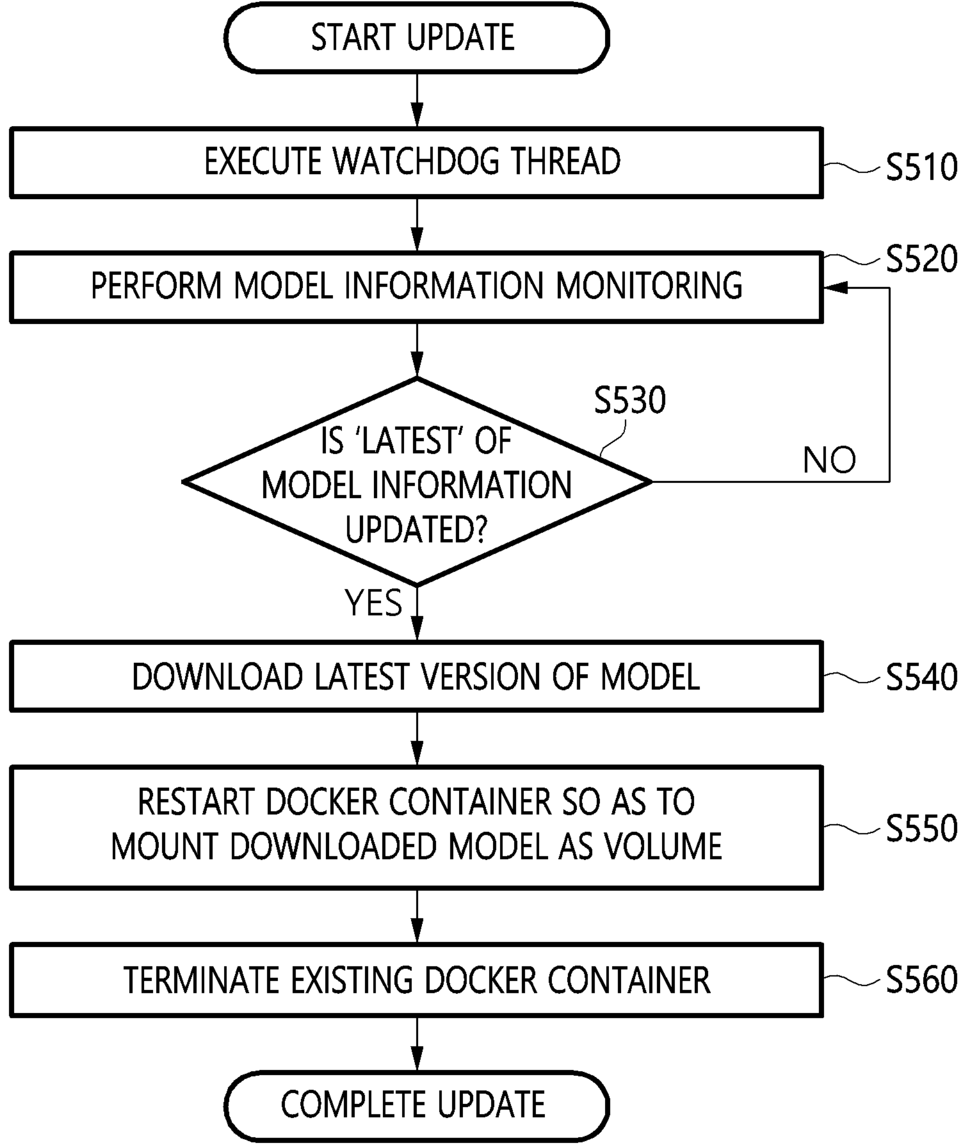

FIG. 13 and FIG. 14 are exemplary view of rolling update with an augmented intelligence model for a Dockerized AI module according to an embodiment.

Referring to FIG. 13 and FIG. 14, whenever each of modules, AutoUpdatePolicy of which is set to UpdateOnRunning, is executed, the distribution agent 220 executes a watchdog thread for monitoring the model information of the corresponding module at step S510.

Accordingly, the watchdog thread performs monitoring by receiving notification using a pub/sub method when model information is updated or by periodically monitoring the model information by itself at step S520.

Subsequently, when the latest tag is updated whereby the latest version of a model is stored at step S530, the watchdog thread notifies the distribution agent 220 of the corresponding event.

The distribution agent 220 receiving the event downloads the new version of the model at step S540, newly starts the module using the new version of the model, sets a connection relationship with another module at step S550, and stops the existing running module at step S560, thereby performing a rolling update.

Figure 15:
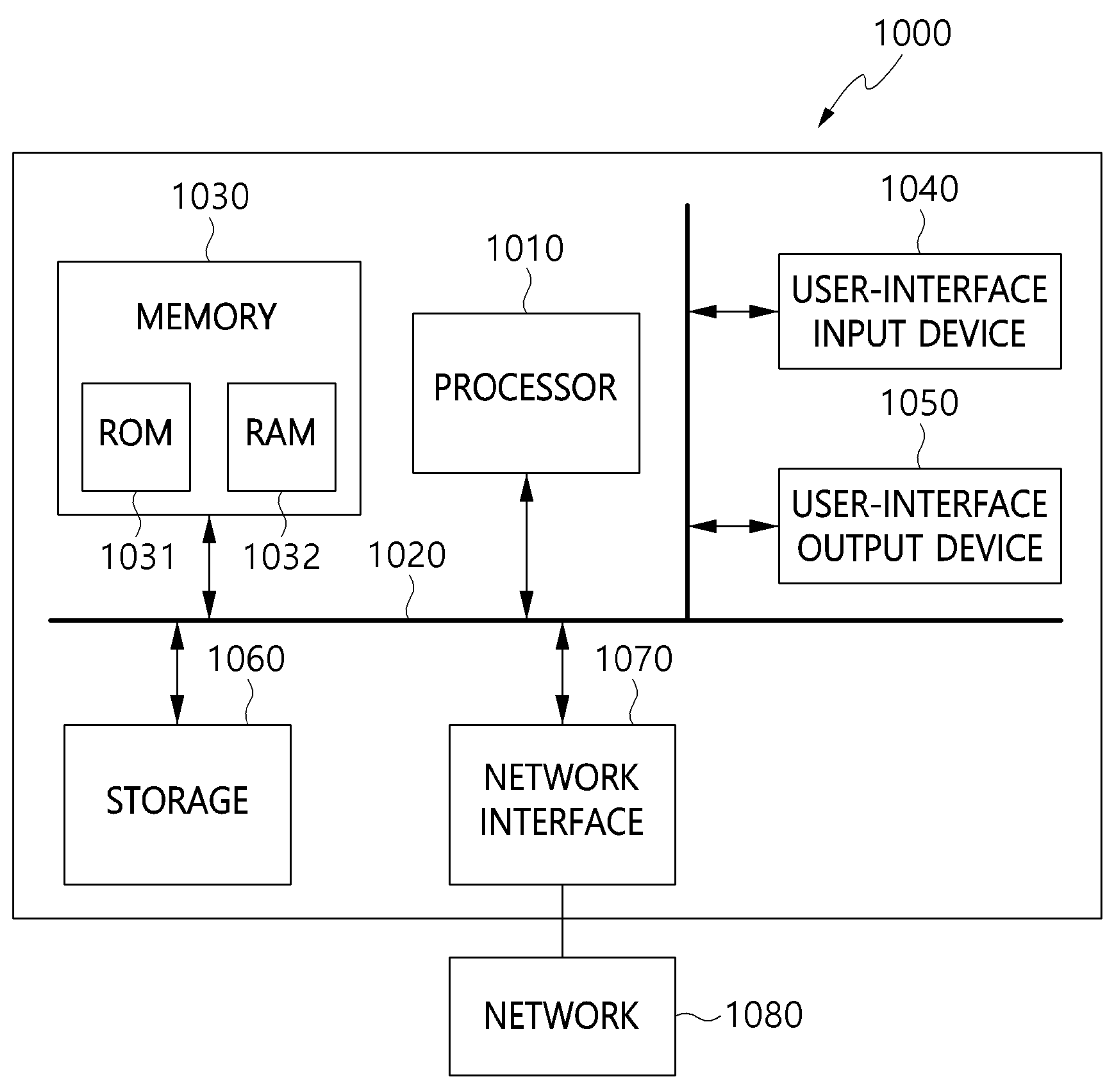
FIG. 15 is a view illustrating a computer system configuration according to an embodiment.

FIG. 15 is a view illustrating a computer system configuration according to an embodiment.

The apparatus for sharing an augmented intelligence model of a containerized AI module according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the configuration of the present disclosure, in a robot capable of providing a service by modularizing various types of AI software as Docker containers and combining modules with each other, an intelligence model, which is neural network data used by the AI module, may be augmented in a high-performance server outside the robot and managed as each version. Also, the intelligence model managed as each version may be easily selected and distributed in connection with the Docker container without a process of rebuilding a Docker image and delivering the same, and when the intelligence model is augmented, the AI module run as a Docker container may be naturally updated using the new intelligence model.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for sharing an augmented intelligence model of a containerized artificial intelligence (AI) module, comprising:

memory in which at least one program is recorded; and a processor for executing the program, wherein the program performs downloading an AI module of a Docker image included in a robot application from container storage by referring to previously stored application configuration information;

retrieving model information about an intelligence model used by the AI module from model information storage and downloading the corresponding intelligence model from model storage based on the retrieved model information; and executing the AI module in a container by mounting the intelligence model stored in a local file system as a volume in the container.

2. The apparatus of claim 1, wherein:

the program further performs configuring the robot application based on module basic information stored in module basic information storage and storing the application configuration information about the configured robot application in application configuration information storage, and when configuring the robot application, the program configures the robot application based on a selection that is input by a user through a robot application configuration graphic user interface (GUI), including a module list window and a robot application configuration window, and performs listing pieces of AI module basic information stored in the module basic information storage in the module list window, disposing AI modules selected from among the listed pieces of AI module basic information at selected locations in the robot application configuration window, and setting a communication connection relationship between the disposed AI modules.

3. The apparatus of claim 1, wherein the model information includes a source file of a class required for reconstructing a neural network structure of the intelligence model; and a model URL file containing a path of a model file of each version.

4. The apparatus of claim 3, wherein, when downloading the intelligence model, the program performs acquiring the model information corresponding to an intelligence model name by connecting to a URL of the model information storage;

changing the model information to a snapshot of a desired version by performing a checkout with a model version included in the model information; and downloading an intelligence model file from a network-based storage device or a cloud storage service using a model storage access path URL indicated by the snapshot.

5. The apparatus of claim 2, wherein:

the module basic information includes reference information for each of the Docker image and the intelligence model required for executing the AI module, and when configuring the robot application, the program further performs extending the module basic information of the AI module disposed in the robot application configuration window.

6. The apparatus of claim 5, wherein:

the reference information for the Docker image includes at least one of a Docker image name, an operation platform, or a URL of Docker storage, or a combination thereof as basic information, and when extending the module basic information, the program adds at least one of environment variables required for executing the container, a command that is capable of being optionally input when executing the container, or input parameters for the command, or a combination thereof to the reference information for the Docker image.

7. The apparatus of claim 6, wherein the program downloads the Docker image, corresponding to a Docker image name and an operation platform, using a URL of Docker storage, sets environment variables required for executing the container, sets a command capable of being optionally input and input parameters for the command when necessary, and executes the Docker image by creating a container instance.

8. The apparatus of claim 5, wherein:

the reference information for the intelligence model includes at least one of an intelligence model name, an operation platform, a URL of the model information storage, or a path of a directory to be stored as the volume in the container, or a combination thereof as basic information, and when extending the module basic information, the program adds at least one of a used intelligence model version, or an automatic update policy of a model in use, or a combination thereof to the reference information for the intelligence model.

9. The apparatus of claim 8, wherein:

when the automatic update policy is set to NoUpdate, the program downloads an intelligence model depending on whether a downloaded and cached intelligence model is present, when the automatic update policy is set to UpdateOnStart, the program checks whether a model is a latest version only when starting a Docker, and when a latest version newer than a downloaded and cached intelligence model is present, the program newly downloads and executes the latest version, and when the automatic update policy is set to UpdateOnRunning, if a latest model is present, the program always downloads the latest model even when a Docker container is running, and sequentially executes the Docker container again through a rolling update.

10. A method for sharing an augmented intelligence model of a containerized artificial intelligence (AI) module, comprising:

downloading an AI module of a Docker image included in a robot application from container storage by referring to previously stored application configuration information;

retrieving model information about an intelligence model used by the AI module from model information storage and downloading the corresponding intelligence model from model storage based on the retrieved model information; and executing the AI module in a container by mounting the intelligence model stored in a local file system as a volume in the container.

11. The method of claim 10, further comprising:

configuring the robot application based on module basic information stored in module basic information storage; and storing the application configuration information about the configured robot application in application configuration information storage wherein:

configuring the robot application comprises configuring the robot application based on a selection that is input by a user through a robot application configuration graphic user interface (GUI), including a module list window and a robot application configuration window, and configuring the robot application includes listing pieces of AI module basic information stored in the module basic information storage in the module list window, disposing AI modules selected from among the listed pieces of AI module basic information at selected locations in the robot application configuration window, and setting a communication connection relationship between the disposed AI modules.

12. The method of claim 10, wherein the model information includes a source file of a class required for reconstructing a neural network structure of the intelligence model; and a model URL file containing a path of a model file of each version.

13. The method of claim 12, wherein downloading the intelligence model includes acquiring the model information corresponding to an intelligence model name by connecting to a URL of the model information storage;

changing the model information to a snapshot of a desired version by performing a checkout with a model version included in the model information; and downloading an intelligence model file from a network-based storage device or a cloud storage service using a model storage access path URL indicated by the snapshot.

14. The method of claim 11, wherein:

the module basic information includes reference information for each of the Docker image and the intelligence model required for executing the AI module, and configuring the robot application further includes extending the module basic information of the AI module disposed in the robot application configuration window.

15. The method of claim 14, wherein:

the reference information for the Docker image includes at least one of a Docker image name, an operation platform, or a URL of Docker storage, or a combination thereof as basic information, and extending the module basic information comprises adding at least one of environment variables required for executing the container, a command that is capable of being optionally input when executing the container, or input parameters for the command, or a combination thereof to the reference information for the Docker image.

16. The method of claim 15, wherein the Docker image, corresponding to the Docker image name and the operation platform, is downloaded using the URL of the Docker storage, the environment variables required for executing the container are set, the command capable of being optionally input and the input parameters for the command are set when necessary, and the Docker image is executed by creating a container instance.

17. The method of claim 14, wherein:

the reference information for the intelligence model includes at least one of an intelligence model name, an operation platform, a URL of the model information storage, or a path of a directory to be stored as the volume in the container, or a combination thereof as basic information, and extending the module basic information comprises adding at least one of a used intelligence model version, or an automatic update policy of a model in use, or a combination thereof to the reference information for the intelligence model.

18. The method of claim 17, wherein:

when the automatic update policy is set to NoUpdate, an intelligence model is downloaded depending on whether a downloaded and cached intelligence model is present, when the automatic update policy is set to UpdateOnStart, whether a model is a latest version is checked only when starting a Docker, and when a latest version newer than a downloaded and cached intelligence model is present, the latest version is downloaded and executed, and when the automatic update policy is set to UpdateOnRunning, if a latest model is present, the latest model is always downloaded even when a Docker container is running, after which the Docker container is sequentially executed again through a rolling update.

19. An apparatus for sharing an augmented intelligence model of a containerized artificial intelligence (AI) module, comprising:

memory in which at least one program is recorded; and a processor for executing the program, wherein the program performs configuring a robot application by setting a communication connection relationship between AI modules selected from among pieces of AI module basic information stored in module basic information storage;

storing application configuration information about the configured robot application in application configuration information storage;

downloading an AI module of a Docker image included in the robot application from container storage by referring to the stored application configuration information;

retrieving model information about an intelligence model used by the AI module from model information storage and downloading the corresponding intelligence model from model storage based on the retrieved model information; and executing the AI module in a container by mounting the intelligence model stored in a local file system as a volume in the container.

20. The apparatus of claim 19, wherein:

the model information includes a source file of a class required for reconstructing a neural network structure of the intelligence model and a model URL file containing a path of a model file of each version, and downloading the intelligence model includes acquiring the model information corresponding to an intelligence model name by connecting to a URL of the model information storage;

changing the model information to a snapshot of a desired version by performing a checkout with a model version included in the model information; and downloading an intelligence model file from a network-based storage device or a cloud storage service using a model storage access path URL indicated by the snapshot.

* * * * *